United States Patent
Shoda

(10) Patent No.: US 11,214,038 B2
(45) Date of Patent: Jan. 4, 2022

(54) WAVELENGTH CONVERSION SHEET PROTECTIVE FILMS AND METHODS OF PRODUCING THE SAME, WAVELENGTH CONVERSION SHEETS AND BACKLIGHT UNITS

(71) Applicant: TOPPAN PRINTING CO., LTD., Tokyo (JP)

(72) Inventor: Ryo Shoda, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 239 days.

(21) Appl. No.: 15/911,760

(22) Filed: Mar. 5, 2018

(65) Prior Publication Data

US 2018/0194107 A1    Jul. 12, 2018

Related U.S. Application Data

(63) Continuation of application No. PCT/JP2016/076173, filed on Sep. 6, 2016.

(30) Foreign Application Priority Data

Sep. 7, 2015 (JP) ................................ 2015-176017

(51) Int. Cl.
*B32B 7/00* (2019.01)
*G02B 6/00* (2006.01)
(Continued)

(52) U.S. Cl.
CPC ............... *B32B 7/02* (2013.01); *B32B 27/00* (2013.01); *B32B 27/04* (2013.01); *B32B 27/38* (2013.01); *G02B 5/20* (2013.01)

(58) Field of Classification Search
CPC ... B32B 7/12; B32B 2255/00; B32B 2255/10; B32B 2255/20; B32B 2307/306;
(Continued)

(56) References Cited

U.S. PATENT DOCUMENTS

2003/0068486 A1* 4/2003 Arney .................... C03C 17/007
428/323
2006/0062995 A1* 3/2006 Yamamoto .............. G02F 1/167
428/332

(Continued)

FOREIGN PATENT DOCUMENTS

CN         101678641 A      3/2010
CN         102205679 A     10/2011
(Continued)

OTHER PUBLICATIONS

International Search Report issued in International Patent Application No. PCT/JP2016/076173 dated Nov. 29, 2016.
(Continued)

*Primary Examiner* — Maria V Ewald
*Assistant Examiner* — Daniel P Dillon
(74) *Attorney, Agent, or Firm* — Foley & Lardner LLP

(57) ABSTRACT

The present invention provides a wavelength conversion sheet protective film having a structure in which a first film, which includes a first substrate and a first barrier layer, and a second film, which includes a second substrate, are bonded to each other at a surface of the first barrier layer and one surface of the second substrate via an adhesive layer, wherein a thermal expansion coefficient in a TD direction in a temperature range of 30 to 90° C. is about $1.0 \times 10^{-4}/K$ or less.

6 Claims, 11 Drawing Sheets

(51) Int. Cl.
*G02F 1/00* (2006.01)
*B32B 7/02* (2019.01)
*B32B 27/00* (2006.01)
*G02B 5/20* (2006.01)
*B32B 27/04* (2006.01)
*B32B 27/38* (2006.01)

(58) Field of Classification Search
CPC ..... B32B 2255/28; B32B 27/027; B32B 7/00; G02B 1/14; G02B 6/00; G02F 1/00
See application file for complete search history.

(56) References Cited

U.S. PATENT DOCUMENTS

| | | | |
|---|---|---|---|
| 2011/0052893 A1 | 3/2011 | Oouchi | |
| 2014/0162035 A1 | 6/2014 | Yamamoto et al. | |
| 2015/0330603 A1* | 11/2015 | Oba | G02F 1/133617 349/71 |
| 2016/0164031 A1* | 6/2016 | Pieper | C09J 5/00 257/13 |
| 2016/0195229 A1 | 7/2016 | Tokinoya | |

FOREIGN PATENT DOCUMENTS

| | | |
|---|---|---|
| CN | 103732391 A | 4/2014 |
| JP | 2005-077553 A | 3/2005 |
| JP | 2009-283441 A | 12/2009 |
| JP | 2010-225373 A | 10/2010 |
| JP | 2011-013567 A | 1/2011 |
| JP | 2011-051195 A | 3/2011 |
| JP | 2011-093195 A | 5/2011 |
| JP | 2014-031488 A | 2/2014 |
| WO | WO-2014/113562 A1 | 7/2014 |
| WO | WO-2015/037733 A | 3/2015 |
| WO | WO-2015/152396 A1 | 10/2015 |
| WO | WO-2016/158723 A1 | 10/2016 |

OTHER PUBLICATIONS

Office Action dated Aug. 4, 2020 for corresponding Chinese Patent Application No. 201610806051.2.

Office Action dated Apr. 14, 2020 for corresponding Japanese Patent Application No. 2017-539171.

* cited by examiner

WAVELENGTH CONVERSION SHEET PROTECTIVE FILMS AND METHODS OF PRODUCING THE SAME, WAVELENGTH CONVERSION SHEETS AND BACKLIGHT UNITS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/076173, filed on Sep. 6, 2016, which is based upon and claims the benefit of priority to Japan Priority Application 2015-176017, filed on Sep. 7, 2015, the disclosures of which are hereby incorporated herein by reference in their entireties.

TECHNICAL FIELD

The present invention relates to wavelength conversion sheet protective films and methods of producing the same, wavelength conversion sheets and backlight units.

BACKGROUND ART

Liquid crystal displays are display devices that display an image or the like by controlling the orientation of liquid crystals to transmit or block light on a region-by-region basis in response to a voltage applied. The liquid crystal displays use a light source, which may be a backlight provided on the back side of the liquid crystal display. For such a backlight, cold cathode tubes have been commonly used. However, in recent years, cold cathode tubes have been replaced with light emitting diodes (LEDs), which have long service lives, good color development, and the like.

In LEDs used for backlights, a white LED technology is of crucial importance. The white LED technology typically uses a method of exciting cerium-doped yttrium-aluminum-garnet (YAG-Ce) phosphors for down conversion by using a blue (450 nm) LED chip. In this case, blue light from the LED is mixed with yellow light generated from the YAG:Ce phosphors having a wide wavelength range to produce white light. However, this white light is often somewhat bluish and imparts an impression of a "cold" or "cool" white.

In recent years, nanosized phosphors using quantum dots have been marketed. Quantum dots are luminescent semiconductor nanoparticles and have a diameter in the range of approximately 1 to 20 nm. The quantum dots, which exhibit a wide excitation spectrum and have high quantum efficiency, can be used as LED wavelength conversion phosphors. Further, the quantum dots are advantageous in that they can have an emission wavelength fully adjustable over the entire visible region by only altering the dot size or the type of the semiconductor material. Therefore, the quantum dots are expected to produce substantially any color, in particular, warm whites that are strongly desired in the illumination industry. In addition, white lights having different color rendering indices can be produced by combining three types of dots having emission wavelengths corresponding to red, green, and blue. Thus, liquid crystal displays provided with a backlight using quantum dots can improve color hue and can express most of the colors that can be recognized by a person without increasing the thickness, power consumption, costs, or manufacturing processes more than those of conventional ones.

A backlight using the white LED described above has a configuration in which a wavelength conversion sheet is combined with an LED light source and a light guide plate. The wavelength conversion sheet is obtained by diffusing phosphors (such as quantum dots and YAG:Ce) having a predetermined emission spectrum in a film, and sealing the surface, as well as the edge if necessary, with a protective film.

The protective film forms a thin layer on the surface of the substrate such as a plastic film by vapor deposition or the like so that deterioration factors in the atmosphere such as water and gas (e.g., oxygen) are not transmitted therethrough. For example, PTLs 1 and 2 propose a wavelength conversion sheet having a structure in which the phosphors are sandwiched between the protective films (barrier films) in order to prevent deterioration of the phosphors, and a backlight using the wavelength conversion sheet.

CITATION LIST

Patent Literature

PTL 1: JP 2011-013567 A; PTL 2: WO 2014/113562

SUMMARY OF THE INVENTION

Technical Problem

However, the present inventors found that the wavelength conversion sheet having a structure in which the phosphors are sandwiched between the wavelength conversion sheet protective films may suffer a local decrease in luminous efficacy of the phosphors if they are exposed to high temperature, for example 85° C. or more for a long period of time, which causes a failure called black streaks. If the wavelength conversion sheet with such black streaks is loaded onto the display, problems such as color defects and display defects may occur.

The present invention has been made to solve the above problem, and aims to provide a wavelength conversion sheet protective film that can prevent occurrence of black streaks on the wavelength conversion sheet even if it is exposed to high temperature for a long period of time. The present invention further aims to provide a method of producing a wavelength conversion sheet protective film, and provide a wavelength conversion sheet using the wavelength conversion sheet protective film and a backlight unit.

Solution to Problem

In order to achieve the above objects, the present invention provides a wavelength conversion sheet protective film having a structure in which a first film, which includes a first substrate and a first barrier layer, and a second film, which includes a second substrate, are bonded to each other at a surface of the first barrier layer and one surface of the second substrate via an adhesive layer, wherein a thermal expansion coefficient in a TD direction in a temperature range of 30 to 90° C. is about $1.0 \times 10^{-4}$/K or less.

The present inventors have made a diligent study on the cause of black streaks and found that black streaks run from an end portion of the wavelength conversion sheet and that linear abnormalities (cracks) also occur at positions corresponding to positions where black streaks occurred on the wavelength conversion sheet protective film. That is, it seems that streak-shaped cracks occur in a barrier layer of the wavelength conversion sheet protective film when the wavelength conversion sheet is exposed to high temperature for a long period of time, and as a consequence, oxygen penetrates through the cracks and causes deterioration of phosphors, leading to occurrence of black streaks. Further, it was also found that these streak-shaped cracks run in the MD direction on the wavelength conversion sheet protective film. Thermal expansion and contraction of the film largely account for the occurrence of streak-shaped cracks. FIG. 7 shows that, when a wavelength conversion sheet protective film 20A is heated, which is shown as a wavelength conversion sheet protective film 20B, it is expanded more in the TD direction than in the MD direction. As a consequence, cracks 30 occur in the barrier layer due to the tension in the TD direction. Further, cracks in the barrier layer may also occur due to heating during production of the wavelength conversion sheet such as during lamination of the wavelength conversion sheet protective film and phosphors.

On the other hand, the wavelength conversion sheet protective film according to the present invention has a configuration in which the first and second films are laminated, and the thermal expansion coefficient in the TD direction in a temperature range of 30 to 90° C. is about $1.0 \times 10^{-4}$/K or less. As a result, tensile stress in the TD direction is reduced to thereby prevent occurrence of streak-shaped cracks in the barrier layer. Accordingly, in production of the wavelength conversion sheet, occurrence of black streaks can be reduced even if it is exposed to high temperature (e.g., 85° C. or more) for a longer period of time.

In the wavelength conversion sheet protective film according to the present invention, the second film may further include a second barrier layer, and a surface of the second barrier layer of the second film may be in contact with the adhesive layer. In this case, further improved barrier properties can be achieved, and occurrence of black streaks can be more reliably reduced in production of the wavelength conversion sheet.

The present invention further provides a method of producing a wavelength conversion sheet protective film having a structure in which a first film, which includes a first substrate and a first barrier layer, and a second film, which includes a second substrate, are bonded to each other at a surface of the first barrier layer and one surface of the second substrate via an adhesive layer, wherein a tension applied to the second film when the second film is bonded to the first film via the adhesive layer is 50 N/m or less.

In industrial production of the wavelength conversion sheet protective film having the above configuration, the first film and the second film are bonded to each other by using, for example, a laminating apparatus. The first film is fed out from a roll-shaped film, an adhesive is applied on the film transported, and then the second film fed out from a roll-shaped is bonded to the first film. The first and second films during transportation undergo tension in the transport direction (MD direction) applied by the laminating apparatus. As a result, the film is pulled in the MD direction and compressed in the direction normal to the MD direction (TD direction). Therefore, the obtained wavelength conversion sheet protective film has internal stress, which is the compressive stress in the MD direction and the tensile stress in the TD direction. In the method of producing a wavelength conversion sheet protective film according to the present invention, the tension applied to the second film when the second film is bonded to the first film via the adhesive is set to be 50 N/m or less to thereby sufficiently reduce the tensile internal stress in the TD direction. As a result, the obtained wavelength conversion sheet protective film has a reduced thermal expansion coefficient in the TD direction. Accordingly, the obtained wavelength conversion sheet protective film can reduce occurrence of streak-shaped cracks in the barrier layer, and also can reduce occurrence of black streaks in production of the wavelength conversion sheet even if it is exposed to high temperature for a long period of time. Furthermore, in the method of producing a wavelength conversion sheet protective film according to the present invention, a laminating apparatus may not be necessarily used for bonding of the first film and the second film, and any bonding technique can be used to reduce the tension applied to the second film at 50 N/m or less. For example, the first film and the second film may be bonded by manual feeding without using a laminating apparatus.

In the method of producing a wavelength conversion sheet protective film according to the present invention, the second film in the wavelength conversion sheet protective film preferably further includes a second barrier layer, and a surface of the second barrier layer of the second film is preferably in contact with the adhesive layer. In this case, the obtained wavelength conversion sheet protective film can provide further improved barrier properties, and more reliably reduce occurrence of black streaks in production of the wavelength conversion sheet even if it is exposed to high temperature for a long period of time.

The present invention further provides a wavelength conversion sheet including a phosphor layer which contains phosphors, and the wavelength conversion sheet protective film according to the present invention. With this wavelength conversion sheet, occurrence of black streaks can be reduced even if it is exposed to high temperature for a long period of time.

The present invention further provides a backlight unit including a LED light source, the wavelength conversion sheet according to the present invention, and a light guide plate that allows light from the LED light source to be incident on the wavelength conversion sheet. With this backlight unit, occurrence of black streaks can be reduced even if it is exposed to high temperature for a long period of time.

Advantageous Effects of the Invention

According to the present invention, a wavelength conversion sheet protective film that can prevent occurrence of black streaks on the wavelength conversion sheet even if it is exposed to high temperature for a long period of time can be provided. Further, a method of producing the wavelength conversion sheet protective film, and a wavelength conversion sheet using the wavelength conversion sheet protective film and a backlight unit can be provided.

DESCRIPTION OF THE REPRESENTATIVE EMBODIMENTS

Figure 1:
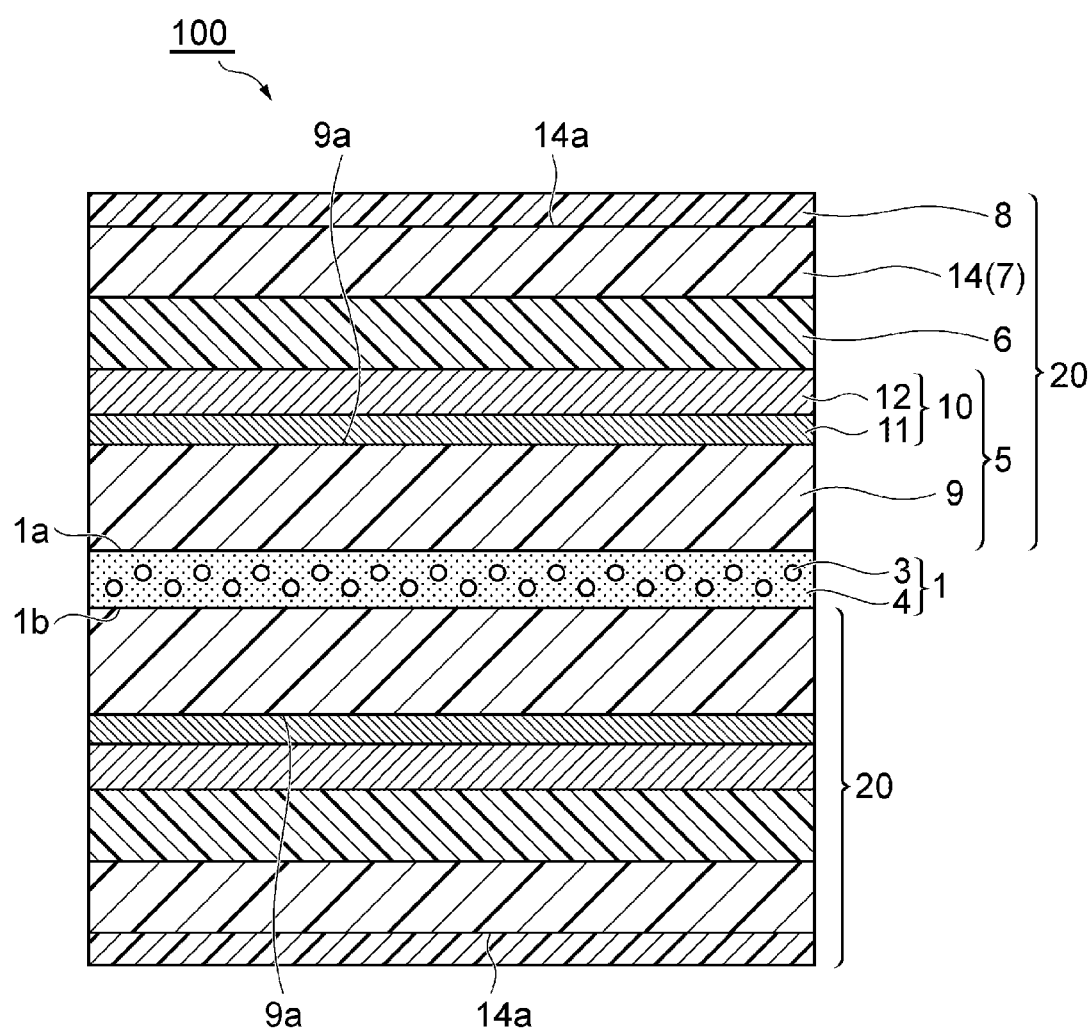
FIG. 1 is a schematic cross-sectional view illustrating a wavelength conversion sheet according to a first embodiment of the present invention.

Preferred embodiments of the present invention will be described in detail below with reference to the attached drawings. In the drawings, the same or corresponding parts are denoted by the same reference characters, and duplicated description thereof is omitted. Further, the dimensions in the drawings are not to scale.

However, it will be understood that the embodiment discussed below and any modifications also described are intended to be representative of the present invention. The present invention is not necessarily limited to the described embodiments.

A wavelength conversion sheet protective film according to the present invention having a structure in which a first film, which includes a first substrate and a first barrier layer, and a second film, which includes a second substrate, are bonded to each other at a surface of the first barrier layer and one surface of the second substrate via an adhesive layer is characterized in that a thermal expansion coefficient of the wavelength conversion sheet protective film in the TD direction in a temperature range of 30 to 90° C. is about $1.0 \times 10^{-4}$/K or less. Further, a wavelength conversion sheet according to the present invention includes a phosphor layer which contains phosphors, and the wavelength conversion sheet protective film according to the present invention. An embodiment of the wavelength conversion sheet protective film having the above configuration and the wavelength conversion sheet will be described.

Wavelength Conversion Sheet According to First Embodiment

First, a first embodiment of the present invention will be described. FIG. 1 is a schematic cross-sectional view illustrating a wavelength conversion sheet according to a first embodiment of the present invention. A wavelength conversion sheet shown in FIG. 1 contains phosphors such as quantum dots, and can be used with a backlight unit for LED wavelength conversion.

A wavelength conversion sheet 100 shown in FIG. 1 is generally configured with a phosphor layer (wavelength conversion layer) 1 that contains quantum dots, and wavelength conversion sheet protective films 20 and 20 (hereinafter, also simply referred to as "protective films") provided on a first surface 1a and a second surface 1b of the phosphor layer 1, respectively. Thus, a structure in which the phosphor layer 1 is enclosed (that is, sealed) between the protective films 20 and 20 is provided. In this configuration, the phosphor layer 1 is desirably sandwiched by a pair of protective films 20 and 20 since barrier properties should be imparted to the phosphor layer 1. Each layer constituting the wavelength conversion sheet 100 will be now described in detail.

(Phosphor Layer)

The phosphor layer 1 is a thin layer which includes a sealing resin 4 and phosphors 3 and has a thickness of several tens to several hundreds of μm. For the sealing resin 4, a photosensitive resin or a thermocurable resin can be used, for example. A mixture of one or more types of phosphors 3 is sealed in the sealing resin 4. In lamination of the phosphor layer 1 and the pair of protective films 20 and 20, the sealing resin 4 serves to join them and fill a gap therebetween. Further, the phosphor layer 1 may be a laminate of two or more phosphor layers, each of which seals only one type of phosphors 3. Two or more types of phosphors 3 used for the one or more phosphor layers described above are selected from those having the same excitation wavelength. The excitation wavelength is selected on the basis of the wavelength of the light irradiated by an LED light source. The phosphorescent colors of two or more types of phosphors 3 are different from each other. When two types of phosphors 3 are used with a blue LED (peak wavelength 450 nm) being used as an LED light source, the phosphorescent colors are preferably red and green. The phosphorescence wavelength of each phosphor and the wavelength of light irradiated by the LED light source are selected on the basis of spectrophotometric properties of the color filter. The phosphorescent peak wavelengths are, for example, 610 nm for red and 550 nm for green.

Next, a particle structure of the phosphors 3 will be described. Preferably, quantum dots having high color purity and thus improved intensity are used as the phosphors 3. The quantum dot may include a core as a light emitting portion and a shell as a protective film covering the core. The core may be made of cadmium selenide (CdSe) or the like, and the shell may be made of zinc sulfide (ZnS) or the like. Surface defects of the CdSe particle are covered with ZnS having a large band gap to thereby improve quantum efficiency. Alternatively, the phosphor 3 may be formed of the core double-covered by a first shell and a second shell. In this case, the core may be made of CdSe, the first shell may be made of zinc selenide (ZnSe), and the second shell may be made of ZnS. Further, as the phosphor 3, YAG:Ce and the like may be used instead of the quantum dots.

The phosphors 3 have a mean particle diameter preferably in the range of 1 nm to 20 nm. Further, the thickness of the phosphor layer 1 is preferably in the range of 1 to 500 μm.

A preferred content of the phosphors 3 in the phosphor layer 1 is in the range of 1 to 20 mass %, and more preferably in the range of 3 to 10 mass % to the total amount of the phosphor layer 1.

Examples of the sealing resin 4 include a thermoplastic resin, a thermosetting resin, and an ultraviolet curable resin. These resins can be used singly or in combination of two or more.

Examples of the thermoplastic resin include: cellulose derivatives such as acetylcellulose, nitrocellulose, acetylbutylcellulose, ethylcellulose, and methylcellulose; vinyl resins such as vinyl acetate and a copolymer thereof, vinyl chloride and a copolymer thereof, and vinylidene chloride and a copolymer thereof; acetal resins such as polyvinyl formal and polyvinyl butyral; acrylic resins such as acrylic resin and a copolymer thereof, and methacrylic resin and a copolymer thereof; polystyrene resin; polyamide resin; linear polyester resin; fluorine resin; and polycarbonate resin.

Examples of the thermosetting resin include phenol resin, urea melamine resin, polyester resin, and silicone resin.

Examples of the ultraviolet curable resin include photopolymerizable prepolymers such as epoxy acrylate, urethane acrylate, and polyester acrylate. These photopolymerizable prepolymers may be used as a main component, and a monofunctional or polyfunctional monomer may be used as a diluent.

(Wavelength Conversion Sheet Protective Film)

The wavelength conversion sheet protective film 20 includes a first film 5 which includes a first substrate 9 and a first barrier layer 10, an adhesive layer 6, and a second film 7 which includes a second substrate 14. The first film 5 and the second film 7 are laminated such that a surface of the first barrier layer 10 of the first film 5 faces the second substrate 14 with the adhesive layer 6 interposed therebetween. Further, a coating layer 8 is provided as necessary on a first surface 14a of the second substrate 14. In other words, the layer located further from the phosphor layer 1 is referred to as the second substrate 14, while the layer located closer to the phosphor layer 1 is referred to as the first substrate 9, having a barrier layer laminated thereon. A film which includes the second substrate 14 and the coating layer 8 disposed on the first surface 14a of the second substrate 14 is laminated on another film (first film 5) which includes the first substrate 9 and the first barrier layer 10 disposed on a first surface 9a of the first substrate such that the second substrate 14 faces the surface of the first barrier layer 10 of the first substrate 9 with the adhesive layer 6 interposed therebetween. This configuration can prevent the first barrier layer 10 from being damaged during a production process, and prevent a decrease in barrier properties caused by defects of the barrier layer.

As shown in FIG. 1, the first film 5 includes the first substrate 9 and the first barrier layer 10 disposed on the first surface 9a of the first substrate 9.

The first and second substrates 9 and 14 are preferably formed of substrates having a total light transmittance of 85% or higher, but not limited thereto. For example, polyethylene terephthalate film, polyethylene naphthalate film, or the like can be used as a substrate having high transparency and high heat resistance.

Further, the thickness of the second substrate 14 is preferably not less than 12 μm in order to provide good gas barrier properties. The thickness of the first substrate 9 is not specifically limited, but is desirably 80 μm or less in order to reduce the total thickness of the wavelength conversion sheet 100.

The thickness of the second substrate 14 is preferably smaller than the thickness of the first substrate 9. Increasing the thickness of the first substrate 9 can reduce thermal contraction of the first substrate 9 due to the thermal history during production of the first barrier layer 10, which may cause uneven thickness of the first film 5. Further, decreasing the thickness of the second substrate 14 relative to the first substrate 9 can prevent a decrease in transmittance of the entire wavelength conversion sheet protective film 20 to thereby reduce unevenness in brightness and color.

Specifically, a thickness D2 of the second substrate 14 is preferably in the range of 4 to 30 μm, and a thickness D1 of the first substrate 9 is preferably in the range of 16 to 80 μm. Further, a difference in thickness D1-D2 between the second substrate 14 and the first substrate 9 is preferably in the range of 5 to 76 μm. Having the D2 in the range of 4 to 30 μm can prevent formation defects during a lamination process. Having the D1 in the range of 16 to 80 μm can reduce curling of the wavelength conversion sheet protective film 20. Furthermore, in order to achieve the thin wavelength conversion sheet protective film 20 having a thickness of no more than 50 μm, the thickness D2 of the second substrate 14 is more preferably in the range of 4 to 20 μm, and a thickness D1 of the first substrate 9 is more preferably in the range of 16 to 45 μm. Moreover, a difference in thickness D1-D2 between the second substrate 14 and the first substrate 9 is more preferably in the range of 5 to 45 μm.

In addition, in the wavelength conversion sheet 100, the upper and lower protective films 20 and 20 are disposed such that the first film 5 which includes the first barrier layer 10 is located closer to the phosphor layer 1 than the second film 7 is. Accordingly, the first barrier layer 10 and the phosphor layer 1 can be located close to each other to thereby improve the effect of the protective film 20 sealing the phosphor layer 1.

The first barrier layer 10 preferably includes, but is not limited to, an inorganic thin film layer 11 and a gas barrier cover layer 12. The barrier layer can be configured as shown in FIG. 1, for example. In the barrier layer 10, the inorganic thin film layer 11 is laminated on the first surface (one surface) 9a of the first substrate 9, and the gas barrier cover layer 12 is laminated on the inorganic thin film layer 11.

The inorganic thin film layer (inorganic oxide thin film layer) 11 may be made of, but is not limited to, aluminum oxide, silicon oxide, magnesium oxide, or a mixture thereof. Among these, aluminum oxide or silicon oxide is preferably used in view of barrier properties and productivity.

The thickness (film thickness) of the inorganic thin film layer 11 is preferably in the range of 5 to 500 nm, and more preferably in the range of 10 to 100 nm. When the film thickness is 5 nm or more, a uniform layer is more likely to be obtained and the layer is more likely to perform a sufficient function as a gas barrier material. Alternatively, when the film thickness is 500 nm or less, the thin layer is more likely to maintain sufficient flexibility and prevent occurrence of cracks in the thin layer after film formation due to external factors such as bending or tension.

The gas barrier cover layer 12 is provided to prevent occurrence of a variety of secondary damage in a post-process and impart high barrier properties. The gas barrier cover layer 12 preferably contains a component which includes at least one selected from the group consisting of hydroxyl group-containing polymer compound, metal alkoxide, metal alkoxide hydrolysate and metal alkoxide polymer in view of obtaining good barrier properties.

The hydroxyl group-containing polymer compound specifically include, for example, a water-soluble polymer such as polyvinyl alcohol, polyvinylpyrrolidone or starch. In particular, the highest barrier properties can be obtained by using polyvinyl alcohol.

The metal alkoxide is a compound expressed by a general formula: $M(OR)_n$ (where M represents a metal atom such as Si, Ti, Al or Zr, R represents an alkyl group such as —$CH_3$ or —$C_2H_5$, and n represents an integer corresponding to a valence of M). Specifically, tetraethoxysilane [$Si(OC_2H5)_4$], triisopropoxy aluminum [Al(O-iso-$C_3H_7$)$_3$] or the like may be used. Tetraethoxysilane and triisopropoxy aluminum are preferred since they are relatively stable in an aqueous solvent after hydrolysis. Further, the metal alkoxide hydrolysate and metal alkoxide polymer include, for example, silicic acid $Si(OH)_4$) as a tetraethoxysilane hydrolysate or a tetraethoxysilane polymer, and aluminum hydroxide (Al (OH)$_3$) as a triisopropoxy aluminum hydrolysate or a triisopropoxy aluminum polymer.

The thickness (film thickness) of the gas barrier cover layer 12 is preferably in the range of 50 to 2000 nm, and more preferably in the range of 100 to 500 nm. When the film thickness is 50 nm or more, then the layer is more likely to obtain sufficient gas barrier properties. When the film thickness is 2000 nm or less, the thin layer is more likely to maintain sufficient flexibility.

Figure 2:
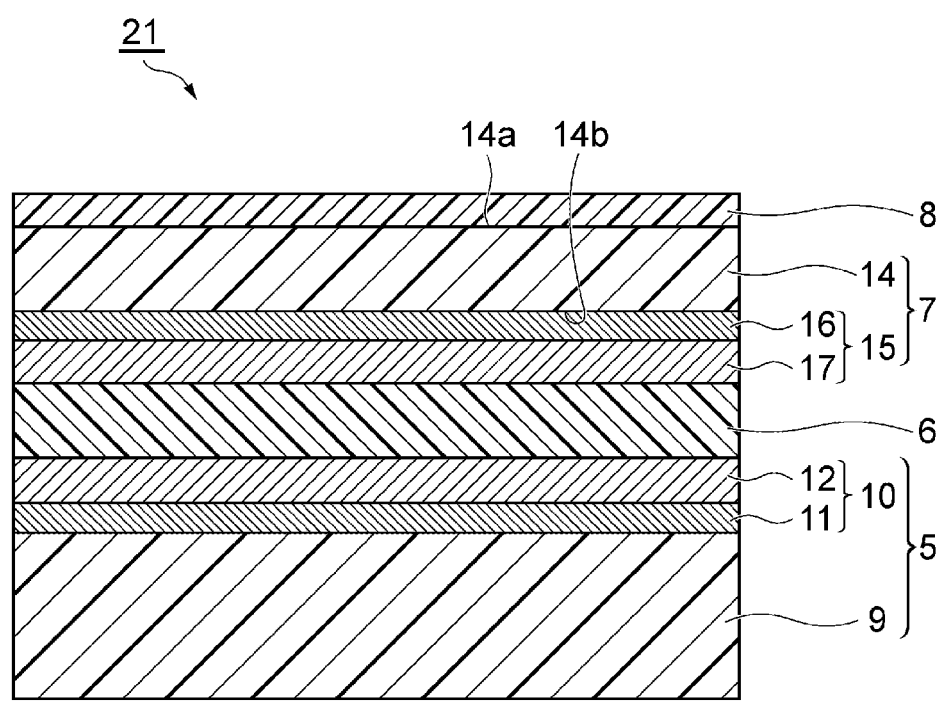
FIG. 2 is a schematic cross-sectional view illustrating a wavelength conversion sheet protective film according to one embodiment of the present invention.

FIG. 2 is a view illustrating a modified example of the wavelength conversion sheet protective film according to the present embodiment. In a wavelength conversion sheet protective film 21 shown in FIG. 2, while the coating layer 8 is disposed on the first surface 14a of the second substrate 14, a barrier layer may be provided on a second surface 14b of the second substrate 14. That is, the second film 7 may include the second substrate 14 and a second barrier layer 15 disposed on the surface 14b located on the second substrate 14 opposite to the coating layer 8. The second barrier layer 15 includes an inorganic thin film layer 16 and a gas barrier cover layer 17. Thus, the first and second barrier layers 10 and 15 are sandwiched between the first substrate 9 and the second substrate 14, and the second barrier layer 15 is disposed at a position closer to the phosphor layer 1. Accordingly, even if the first barrier layer 10 or the second barrier layer 15 has defects such as micro pinholes, barrier properties can be more effectively performed. The inorganic thin film layer 16 and the gas barrier cover layer 17 may have the same configuration as that of the inorganic thin film layer 11 and the gas barrier cover layer 12, respectively.

Figure 3:
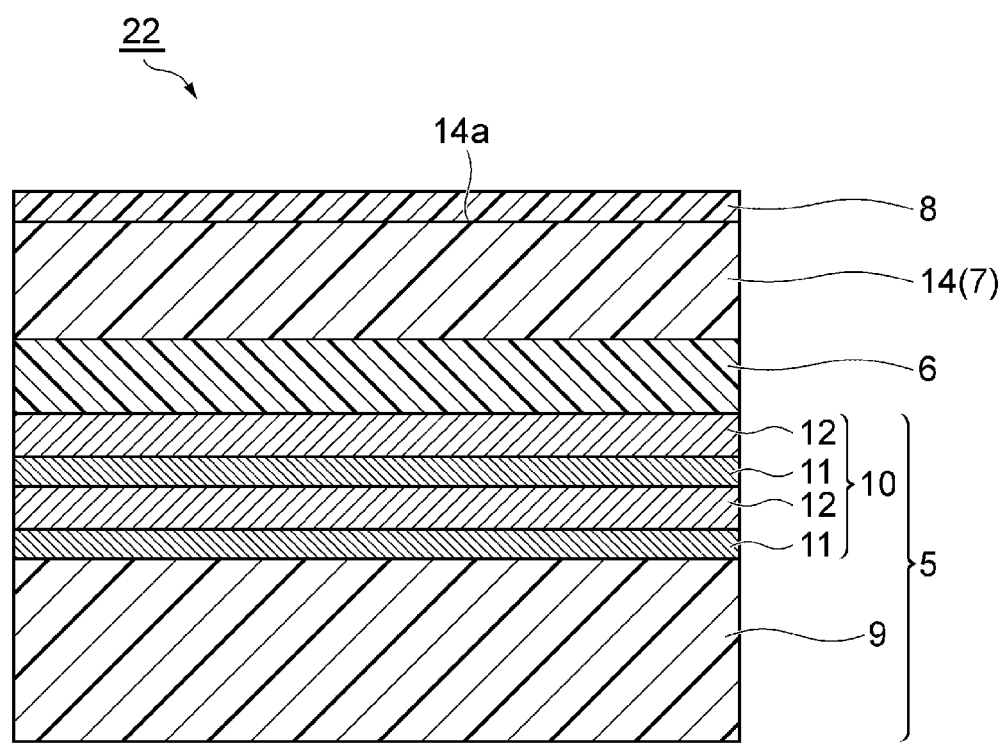
FIG. 3 is a schematic cross-sectional view illustrating a wavelength conversion sheet protective film according to one embodiment of the present invention.

FIG. 3 is a view illustrating another modified example of the wavelength conversion sheet protective film according to the present embodiment. In a wavelength conversion sheet protective film 22 shown in FIG. 3, the first barrier layer 10 may have a structure in which a plurality of inorganic thin film layers 11 and gas barrier cover layers 12 are laminated. In particular, by virtue of the inorganic thin film layers 11 and the gas barrier cover layers 12 being alternately laminated, defects such as micro pinholes of the inorganic thin film layer 11 can be prevented by having the gas barrier cover layers 12 and other inorganic thin film layers 11 to thereby improve barrier properties.

The first barrier layer 10 and the second barrier layer 15 may also include an anchor coat layer as necessary. The anchor coat layer is provided between the first and second substrates 9 and 14 and the inorganic thin film layers 11 and 16, respectively, in order to improve adhesiveness therebetween. Further, the anchor coat layer may have barrier properties to prevent penetration of water and oxygen.

The anchor coat layer can be made of a resin, for example, selected from polyester resin, isocyanate resin, urethane resin, acryl resin, polyvinyl alcohol resin, ethylene vinyl alcohol resin, vinyl modified resin, epoxy resin, oxazoline group-containing resin, modified styrene resin, modified silicone resin, alkyl titanate, and the like. These resins can be used singly or in combination or two or more as a composite resin to form the anchor coat layer.

The thickness of the anchor coat layer is preferably in the range of 5 to 500 nm, and more preferably in the range of 10 to 100 nm. When the thickness is 5 nm or more, adhesiveness or barrier properties against water and oxygen between the first and second substrates 9 and 14 and the inorganic thin film layers 11 and 16 are more likely to be improved. When the thickness is 500 nm or less, a homogeneous layer with internal stress due to film thickness being sufficiently reduced is more likely to be formed.

As shown in FIGS. 1 to 3, the adhesive layer 6 is provided between the first film 5 and the second film 7 to bond the first film 5 and the second film 7 as a laminate. The adhesive layer 6 may be, but is not specifically limited to, an adhesive or pressure-sensitive adhesive such as an acrylic material, urethane-based material and polyester-based material. More specifically, any of acrylic pressure-sensitive adhesive, acrylic adhesive, urethane-based adhesive and ester-based adhesive may be used.

The thickness of the adhesive layer 6 is not specifically limited, but is preferably not more than 10 μm in order to reduce the thickness of the wavelength conversion sheet protective film and the total thickness or the wavelength conversion sheet. Meanwhile, in order to obtain improved adhesiveness, the thickness of the adhesive layer 6 is preferably not less than 3 μm.

In order to perform one or more optical functions or antistatic functions, the coating layer 8 is disposed on each surface of the two wavelength conversion sheet protective films 20 and 20, that is, on both surfaces of the wavelength conversion sheet 100. The optical functions include, but are not limited to, interference fringe (Moire) prevention, antireflection, diffusion, and the like. Among others, the coating layer 8 preferably has at least interference fringe prevention as an optical function. In the present embodiment, the following description will be provided for the case where the coating layer 8 has at least an interference fringe prevention function.

The coating layer 8 may include a binder resin and fine particles. Further, fine irregularities may be produced on the surface of the coating layer 8 since the fine particles are embedded in the binder resin so that the fine particles are partially exposed from the surface of the coating layer 8. Thus, providing the coating layers 8 on each surface of the wavelength conversion sheet protective films 20 and 20, that is, on both surfaces of the wavelength conversion sheet 100 can prevent occurrence of interference fringes such as Newton's rings in a more reliable manner to thereby obtain a display with high efficiency, high precision, and a long service life. Further, the coating layer 8 can be provided only on the surface of one wavelength conversion sheet protective film 20, that is, only on one surface of the wavelength conversion sheet 100. With this configuration as well, the above effect can be achieved.

The binder resin layer is not specifically limited, but a resin having high optical transparency may be used. More specifically, examples of materials that can be used include a thermoplastic resin, a thermosetting resin and an ionizing radiation hardening resin, such as a polyester resin, acrylic resin, acrylic urethane resin, polyester acrylate resin, polyurethane acrylate resin, urethane resin, epoxy resin, polycarbonate resin, polyamide resin, polyimide resin, melamine resin, phenol-based, and the like. Among these, an acrylic resin having high light resistance and good optical properties is desirably used. They can be used as a single material or a combination of a plurality of materials.

Examples of the fine particles that can be used include, but are not limited to, inorganic fine particles, such as silica, clay, talc, carbonic acid calcium, sulfuric acid calcium, barium sulfate, titanium oxide, alumina, and the like, as well as organic fine particles, such as a styrene resin, urethane resin, silicone resin, acrylic resin, and the like. These materials can be used singly or in combination of two or more.

The mean particle diameter of fine particles is preferably in the range of 0.1 to 30 μm, and more preferably in the range of 0.5 to 10 μm. When the mean particle diameter of the fine particles is 0.1 μm or more, then a high interference fringe prevention function is more likely to be obtained. When the mean particle diameter of fine particles is 30 μm or less, improved transparency is more likely to be obtained.

The content of the fine particles in the coating layer 8 is preferably in the range of 0.5 to 30 mass %, and more preferably in the range of 3 to 10 mass % to the total amount of the coating layer 8. When the content of the fine particles is 0.5 mass % or more, improved light diffusion and interference fringe prevention are more likely to be obtained. When the content of the fine particles is 30 mass % or less, brightness is not lowered.

The wavelength conversion sheet protective film 20 with the above configuration should have a thermal expansion coefficient of about $1.0 \times 10^{-4}$/K or less in the TD direction in a temperature range of 30 to 90° C. That is, the maximum thermal expansion coefficient in the TD direction in a temperature range of 30 to 90° C. should be about $1.0 \times 10^{-4}$/K or less. The thermal expansion coefficient in the TD direction can be measured by thermo-mechanical analysis (TMA). The measurement condition can be defined as, for example, load: 50 mN, temperature rising rate: 5° C./min, and measurement temperature: 30 to 150° C. With the thermal expansion coefficient of about $1.0 \times 10^{-4}$/K or less, occurrence of streak-shaped cracks in the barrier layer (the first barrier layer 10 and the second barrier layer 15) can be reduced, and occurrence of black streaks during production of the wavelength conversion sheet 100 can be reduced even if it is exposed to high temperature for a long period of time. In order to more reliably ensure the above effect, the above thermal expansion coefficient is preferably $0.8 \times 10^{-4}$/K or less, more preferably $0.5 \times 10^{-4}$/K or less, and still more preferably $0.3 \times 10^{-4}$/K or less. Although the lower limit of the thermal expansion coefficient is not specifically limited, the thermal expansion coefficient is typically not less than $-0.8 \times 10^{-4}$/K.

Further, in order to more reliably reduce the occurrence of black streaks when being exposed to high temperature for a long period of time, the thermal expansion coefficient of the wavelength conversion sheet protective film 20 in the TD direction in a temperature range of 30 to 110° C. is preferably about $1.0 \times 10^{-4}$/K or less, more preferably about $0.8 \times 10^{-4}$/K or less, still more preferably about $0.5 \times 10^{-4}$/K or less, and yet still more preferably about $0.3 \times 10^{-4}$/K or less.

Although the thermal expansion coefficient of the wavelength conversion sheet protective film 20 in the MD direction in a temperature range of 30 to 90° C. is not specifically limited, it is typically not less than $-1.5 \times 10^{-4}$/K and not more than $1.5 \times 10^{-4}$/K.

By using the wavelength conversion sheet protective film 20 thus configured as a protective film for protecting the phosphors of the wavelength conversion sheet 100, the performance of the wavelength conversion sheet 100 that uses the phosphors such as quantum dots can be maximized.

Next, a method of producing the wavelength conversion sheet 100 of the present embodiment will be described. In the method of producing the wavelength conversion sheet 100 of the present embodiment, for example, the phosphor layer 1 can be sandwiched by the pair of wavelength conversion sheet protective films 20 and 20 through the procedure set forth below.

(Production Process of Wavelength Conversion Sheet Protective Film 20)

In the production process of the wavelength conversion sheet protective films 20 and 20, the coating layer 8 is first disposed on the first surface 14a of the second substrate 14. Specifically, a coating solution prepared by mixing a binder resin and fine particles is applied on the first surface 14a of the second substrate 14, and then dried to form the coating layer 8.

Further, the inorganic thin film layer 11 is laminated on the first surface 9a of the first substrate 9 by a vapor deposition method, for example. Then, a coating agent is applied on the surface of the inorganic thin film layer 11 and dried to form the gas barrier cover layer 12. The coating agent is made of an aqueous solution or water/alcohol mixture solution as a base resin containing at least one selected from the group consisting of hydroxyl group-containing polymer compound, metal alkoxide, metal alkoxide hydrolysate, and metal alkoxide polymer. Thus, the first film 5 having the first barrier layer 10 made up of the inorganic thin film layer 11 and the gas barrier cover layer 12 disposed on one of the surfaces of the first substrate 9 is obtained.

Then, the film having the coating layer 8 is laminated on the first film 5 having the first barrier layer 10 by using the adhesive layer 6. Specifically, the second substrate 14 (second film 7) having the coating layer 8 is laminated on the surface of the barrier layer of the first film 5 by using the adhesive layer 6. The adhesive layer 6 may be any of acrylic pressure-sensitive adhesive, acrylic adhesive, urethane-based adhesive and ester-based adhesive. Thus, the wavelength conversion sheet protective film 20 made up of two laminated films is obtained.

Although the coating layer 8 is first formed according to the example described in this embodiment, the timing when the coating layer 8 is formed is not specifically limited. For example, two films may be first bonded to each other before the coating layer 8 is formed, and then the coating layer 8 may be formed on the surface 14a of the second substrate 14. As a matter of course, this step is not necessary if the coating layer 8 is not provided.

In the present embodiment, the first film 5 and the second film 7 are bonded to each other under a condition that a tension applied to the second film is 50 N/m or less. Accordingly, the tensile internal stress in the TD direction is sufficiently reduced and thus the thermal expansion coefficient in the TD direction is reduced. As a result, the wavelength conversion sheet protective film 20 that can reduce occurrence of streak-shaped cracks in the barrier layer can be obtained. In order to more reliably ensure the above effect, the tension applied to the second film is preferably 30 N/m or less, and more preferably 15 N/m or less. The lower limit of the tension applied to the second film is not specifically limited, and the tension may be 0 N/m or 10 N/m, for example.

The first film 5 and the second film 7 may be bonded to each other by any technique as long as the above conditions are satisfied. Although the bonding may be performed by manual feeding, a laminating apparatus such as the one shown in FIG. 6 can be used in industrial production of the wavelength conversion sheet protective film 20.

Figure 6:
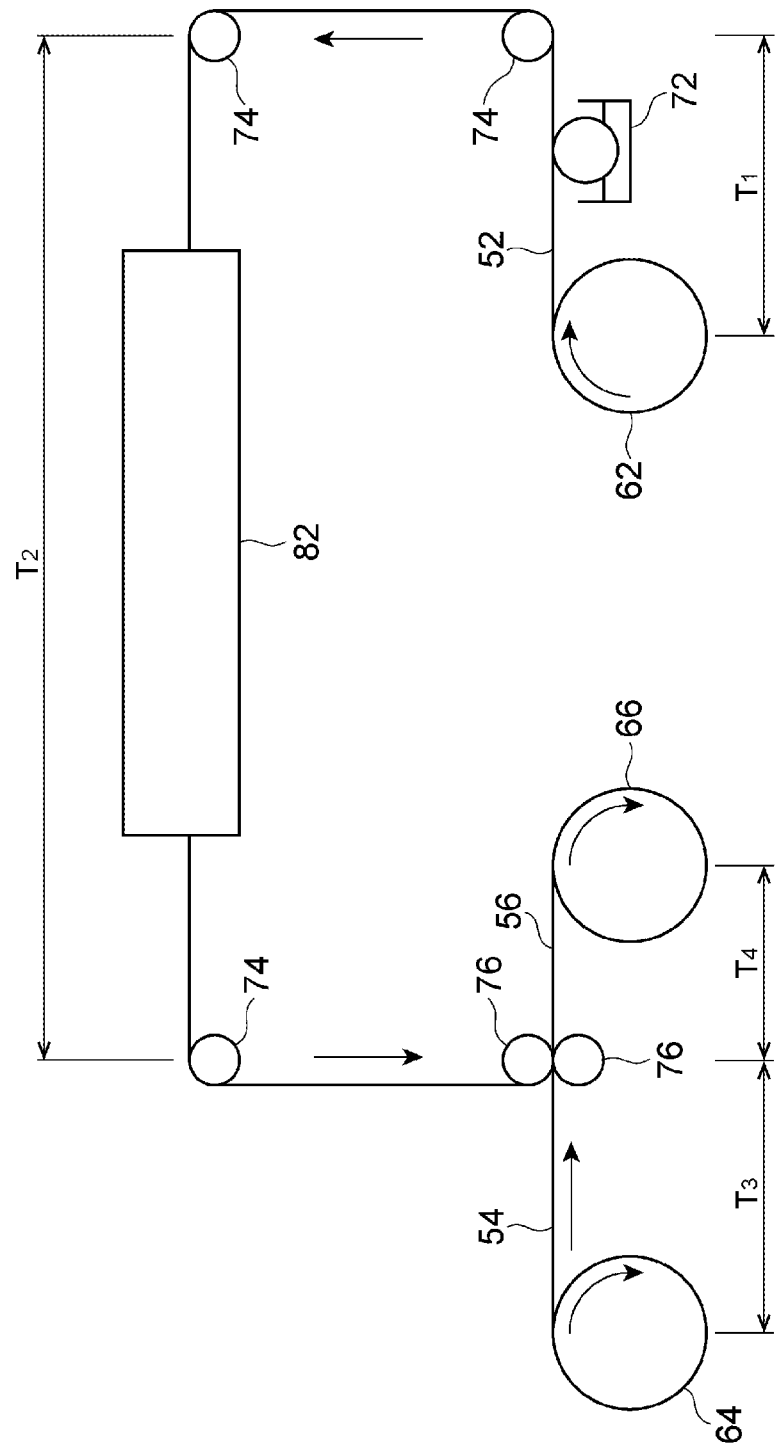
FIG. 6 is a schematic view illustrating an example of a laminating apparatus used for bonding a first film and a second film.
Figure 7:
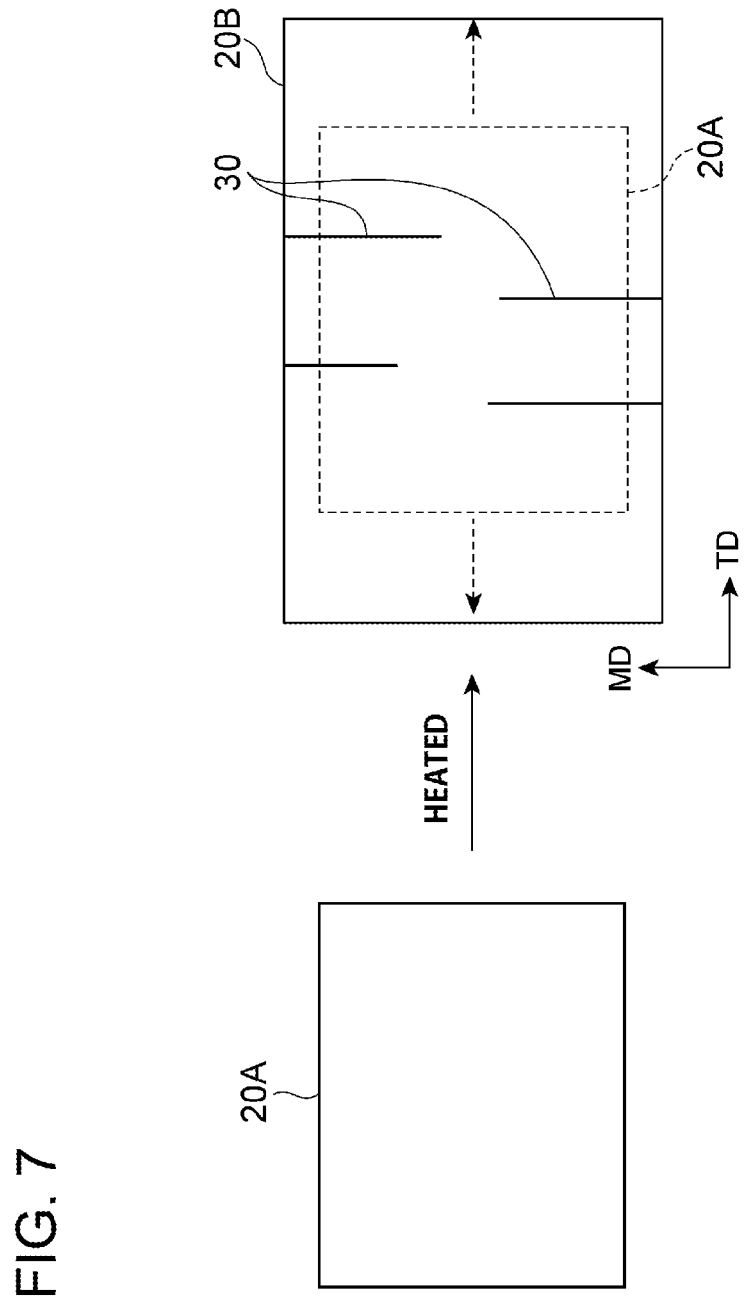
FIG. 7 is an explanatory view illustrating a mechanism of cracking in a wavelength conversion sheet protective film.

FIG. 6 is a schematic view illustrating an example of a laminating apparatus used for bonding the first film 5 and the second film 7. When the laminating apparatus shown in FIG. 6 is used, bonding is performed by the following procedure (bonding step). First, an adhesive (pressure-sensitive adhesive) is applied on the surface of the barrier layer of the first film 52 fed out from the first feed-out roll 62 by an adhesive application unit 72. After the adhesive is applied, the first film 52 is guided by a guide roll 74 into an oven 82 in which the adhesive is dried. The temperature inside the oven 82 can be gradually changed typically by using three units, each of which are set at the temperature in the range of 25 to 200° C.

After being dried, the first film 52 is guided by the guide roll 74 and transported to pinch rolls 76. Meanwhile, a second film 54 fed out from a second feed-out roll 64 is transported to the pinch rolls 76, and bonded to the surface of the first film 52 on which an adhesive is applied between the pinch rolls 76 and 76. A pressure between the pinch rolls 76 and 76 during lamination of the first film 52 and the second film 54 is typically in the range of 0.05 to 0.2 MPa. After that, a laminated film 56 formed by the first film 52 and the second film 54 bonded via an adhesive is taken up by a take-up roll 66.

In the above bonding process, a tension $T_1$, $T_2$, $T_3$ and $T_4$ applied on the film transport is adjusted to a value in a desired range. Of these tensions, the second feed-out tension $T_3$ applied on the second film 54 in the present embodiment when the second film 54 is fed out and bonded to the first film 52 is 50 N/m or less. The second feed-out tension $T_3$ is required to be 50 N/m or less, preferably 10 to 50 N/m, more preferably 10 to 30 N/m, and still more preferably 10 to 15 N/m. With the second feed-out tension $T_3$ within the above range, the tensile internal stress in the TD direction is sufficiently reduced and thus the thermal expansion coefficient in the TD direction is reduced. As a result, a wavelength conversion sheet protective film 20 that can reduce occurrence of streak-shaped cracks in the barrier layer can be obtained.

The first feed-out tension $T_1$ applied on the first film 52 in feeding out of the first film 52 is fed out is preferably 10 to 100 N/m, more preferably 10 to 30 N/m, and still more preferably 10 to 15 N/m.

The oven tension $T_2$ applied on the first film 52 when it passes through the oven 82 is preferably 10 to 100 N/m, more preferably 10 to 60 N/m, and still more preferably 10 to 40 N/m.

The take-up tension $T_4$ applied on the laminated film 56 in taking up by the take-up roll 66 is preferably 10 to 150 N/m, more preferably 10 to 100 N/m, and still more preferably 10 to 60 N/m.

The transportation rate of each film can be typically 5 to 100 m/min.

Aging is preferably selected as appropriate depending on the material. For example, it is preferably 40 to 60° C. and 1 to 3 days.

(Production Process of Phosphor Layer 1)

In the production process of the phosphor layer 1, a mixture solution is prepared by mixing the phosphors 3, the sealing resin 4, and a solvent as necessary. Then, the prepared mixture solution is applied on the surface of the wavelength conversion sheet protective film 20 on which the coating layer 8 is not provided. Then, another wavelength conversion sheet protective film 20 which is separately produced is laminated. In this process, the surfaces 1a and 1b of the phosphor layer 1 are oriented to face the surfaces of two wavelength conversion sheet protective film 20 on which the coating layer 8 is not provided, respectively. When the sealing resin 4 is a photosensitive resin, the photosensitive resin is cured (UV-cured) by ultraviolet irradiation to thereby obtain the wavelength conversion sheet 100 of the present embodiment. Further, the photosensitive resin may be further thermally cured after UV curing. As the sealing resin 4, a thermosetting resin and a chemically curable resin can be used instead of a photosensitive resin.

UV curing can be conducted at 100 to 1000 mJ/cm$^2$, for example. Further, thermal curing can be conducted at 60 to 120° C. for 0.1 to 3 minutes, for example.

While the example of the present embodiment has been described such that the phosphor layer 1 is first formed on the surface of the wavelength conversion sheet protective film 20 on which the coating layer 8 is not provided, and then another wavelength conversion sheet protective film 20 is laminated on the surface of the phosphor layer 1, the configuration is not limited thereto.

Wavelength Conversion Sheet According to Second Embodiment

Figure 4:
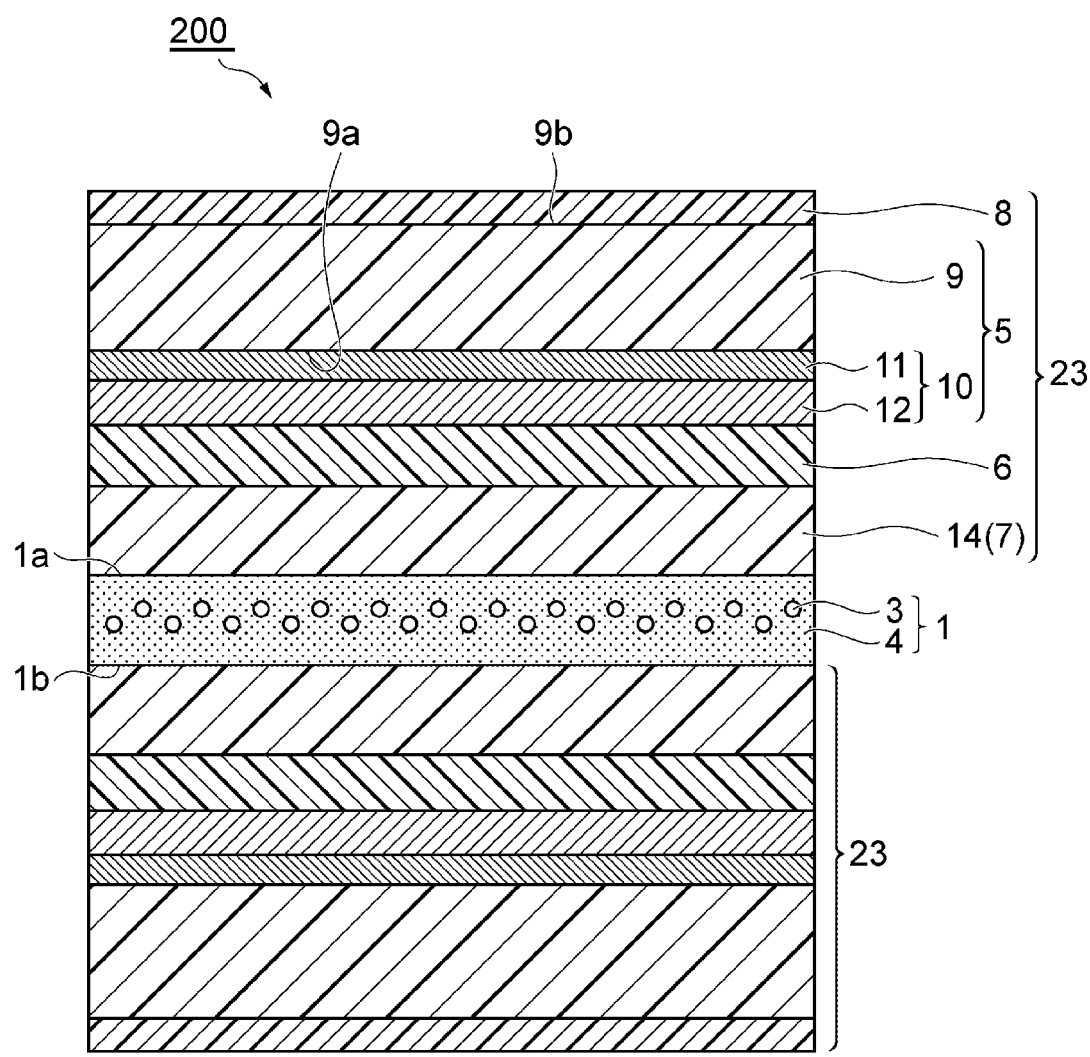
FIG. 4 is a schematic cross-sectional view illustrating a wavelength conversion sheet according to a second embodiment of the present invention.

Next, a second embodiment of the present invention will be described. FIG. 4 is a schematic cross-sectional view illustrating a wavelength conversion sheet according to the second embodiment of the present invention. A wavelength conversion sheet 200 of the second embodiment is different from the wavelength conversion sheet 100 of the first embodiment only in the configuration of the wavelength conversion sheet protective film 23. Therefore, in the wavelength conversion sheet 200 of the second embodiment, the same reference signs refer to the same components as those of the first embodiment and the description thereof is omitted.

As shown in FIG. 4, the wavelength conversion sheet 200 of the present embodiment is generally configured with the phosphor layer (wavelength conversion layer) 1 that contains phosphors, and wavelength conversion sheet protective films 23 and 23 provided on the first surface 1a and the second surface 1b of the phosphor layer 1, respectively. Thus, a structure in which the phosphor layer 1 is enclosed (sealed) between the protective films 23 and 23 is provided.

(Wavelength Conversion Sheet Protective Film)

The wavelength conversion sheet protective film 23 of the present embodiment includes the first film 5 which includes the first substrate 9 and the first barrier layer 10, the adhesive layer 6, and the second substrate 14 (second film 7), and a coating layer 8. While the coating layer 8 is disposed on the second surface 9b of the first substrate 9, the first barrier layer 10 is provided on the first surface 9a of the first substrate 9. The first substrate 9 is laminated with the first barrier layer 10 facing the second substrate 14 via the adhesive layer 6. In other words, the layer located further from the phosphor layer 1 is referred to as the first substrate 9, while the layer located closer to the phosphor layer 1 is referred to as the second substrate 14. A film (first film 5) which includes the first substrate 9, the coating layer 8 disposed on the second surface 9b of the first substrate 9, and the first barrier layer 10 disposed on the first surface 9a of the first substrate is laminated on the second substrate 14 such that the second substrate 14 faces the first barrier layer 10 with the adhesive layer 6 interposed therebetween. According to this configuration of the wavelength conversion sheet protective film 23, the second substrate 14 is disposed between the first barrier layer 10 and the phosphor layer 1 to be protected. Accordingly, the second substrate 14 can reduce the impact even if irregularities or foreign substances are present on the phosphor layer 1, which reduces damage to the first barrier layer 10.

In production of the wavelength conversion sheet 200 of the present embodiment, the respective wavelength conversion sheet protective films 23 and 23 are laminated with the respective second substrates 14 facing the phosphor layer 1 as shown in FIG. 4. More specifically, in the wavelength conversion sheet 200, the wavelength conversion sheet protective films 23 and 23 are laminated such that the phosphor layer 1 is sandwiched between the second substrates 14. In this embodiment as well, the coating layer 8 is provided on the surfaces of the respective phosphor protective films 23 and 23 to serve as both surfaces of the wavelength conversion sheet 200.

In the wavelength conversion sheet 200, the film thickness of the second substrate 14 is smaller than the film thickness of the first substrate 9. As a result, a distance between the first barrier layer 10 and the phosphor layer 1 can be reduced to thereby obtain an effect of reducing penetration of oxygen or water into the phosphor layer 1 in addition to the effects described in the first embodiment.

The thickness of the first substrate 9 is preferably larger than the thickness of the second substrate 14. Increasing the thickness of the first substrate 9 can reduce thermal contraction of the first substrate 9 due to the thermal history during production of the first barrier layer 10, which may cause uneven thickness of the first film 5. Further, the second substrate 14 does not undergo the thermal history and thus thermal contraction since an inorganic thin film layer or a gas barrier cover layer is not provided on the second substrate 14. Moreover, decreasing the thickness of the second substrate 14 relative to the first substrate 9 can prevent a decrease in transmittance of the entire wavelength conversion sheet protective film 23 to thereby reduce unevenness in brightness and color.

In view of the above, the thickness D2 of the second substrate 14 is preferably in the range of 4 to 20 μm, and the thickness D1 of the first substrate 9 is preferably in the range of 16 to 80 μm. Having the thickness D2 of the second substrate 14 in the range of 4 to 20 μm can reduce an impact by the second substrate 14 to thereby reduce damage to the first barrier layer 10 and also reduce shape defects during lamination. Having the D1 in the range of 16 to 80 μm can reduce curling of the wavelength conversion sheet protective film 23.

Further, as with the wavelength conversion sheet protective film 20, the wavelength conversion sheet protective film 23 also satisfies the condition of the thermal expansion coefficient in the TD direction in a temperature range of 30 to 90° C. as described in the first embodiment. Accordingly, occurrence of streak-shaped cracks in the barrier layer can be prevented, and occurrence of black streaks in production of the wavelength conversion sheet 200 can be reduced even if it is exposed to high temperature for a long period of time.

Further, as with the wavelength conversion sheet protective film 22 shown in FIG. 3, a plurality of inorganic thin film layers 11 and gas barrier cover layers 12 may be laminated in the first barrier layer 10. In particular, by virtue of the inorganic thin film layers 11 and the gas barrier cover layers 12 alternately laminated, defects such as micro pinholes in the inorganic thin film layer 11 can be prevented by having the gas barrier cover layers 12 and other inorganic thin film layers 11 to thereby improve barrier properties.

According to the wavelength conversion sheet 20 of the second embodiment, the advantageous effects similar to those of the wavelength conversion sheet 100 of the first embodiment can be obtained.

<Backlight Unit>

Figure 5:
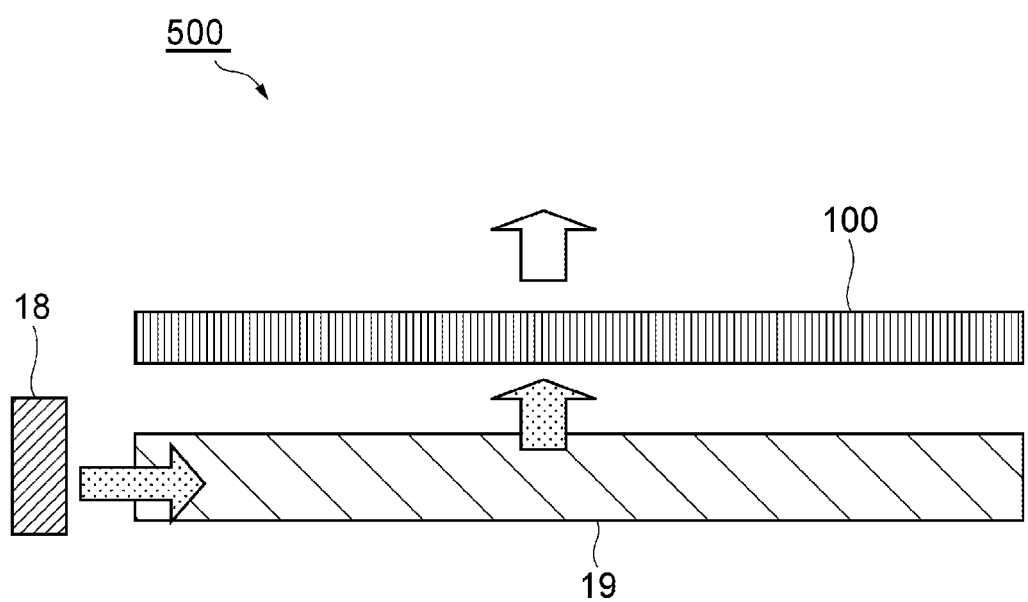
FIG. 5 is a schematic cross-sectional view illustrating a backlight unit according to one embodiment of the present invention.

FIG. 5 illustrates an embodiment of a backlight unit. A backlight unit 500 of the present embodiment includes a light emitting diode (LED) light source 18, a light guide plate 19, and the wavelength conversion sheet 100. Alternatively, in the backlight unit 500, the wavelength conversion sheet 100 can be replaced with the wavelength conversion sheet 200. Further, although not shown in the figure, the backlight unit 500 may include a reflection plate, a diffusion plate, a prism sheet, and the like.

The LED light source 18 is disposed on an end face of the light guide plate 19, while the wavelength conversion sheet 100 is disposed on the light guide plate 19 (in the travel direction of light). Inside the LED light source 18, a plurality of LED elements emitting blue light are provided. The LED devices may be violet LEDs, or may be LEDs with an even shorter wavelength. The LED light source irradiates light towards an end face of the light guide plate. In the backlight unit using the wavelength conversion sheet 100 of the present embodiment, for example, the emitted light passes through the light guide plate and enters the layer (phosphor layer) 1 in which a resin such as acrylic resin or epoxy resin is mixed with phosphors.

The light guide plate 19 serves to efficiently guide light emitted from the LED light source 18, and may be made of known materials. The light guiding layer 19 may be made of, for example, an acrylic film, a polycarbonate film, or a cycloolefin film. The light guide plate 19 can be formed by, for example, silk printing, molding such as injection molding or extrusion molding, or ink jet printing. The thickness of the light guide plate 19 is in the range of 100 to 1000 μm, for example.

While the preferred embodiments of the present invention are described above, the technical scope of the present invention is not limited to the above embodiments, and various modifications can be made without departing from the principle of the present invention. For example, the configurations of the wavelength conversion sheets 100 and 200 and the configurations of the wavelength conversion sheet protective films 20, 21, 22 and 23 and the configuration of the backlight unit 500 are only examples, and are not limited to these examples.

As in the first and second embodiments described above, the phosphor layer 1 of the wavelength conversion sheet of the present invention may be sandwiched between the same wavelength conversion sheet protective films 20 or 23, or may be sandwiched between the wavelength conversion sheet protective films having different configurations.

Further, the wavelength conversion sheet according to the present invention may have a configuration in which at least one of the wavelength conversion sheet protective films covering the phosphor layer 1 has the coating layer 8, or both of the wavelength conversion sheet protective films have the respective coating layers 8.

Further, in order to improve adhesiveness between the wavelength conversion sheet protective film and the phosphor layer 1, in the wavelength conversion sheet of the present invention, the surface of the wavelength conversion sheet protective film to be in contact with the phosphor layer 1 may undergo a modification treatment or may be provided with an easy-adhesive layer made of urethane resin or the like.

Further, in the wavelength conversion sheets 100 and 200 shown in FIGS. 1 and 4, respectively, the first barrier layer 10 is described as having one inorganic thin film layer 11 and one gas barrier cover layer 12. However, the first barrier layer 10 may also include two or more layers of at least one of the inorganic thin film layer 11 and the gas barrier cover layer 12. In this case, the inorganic thin film layers 11 and the gas barrier cover layers 12 are preferably alternately laminated.

Moreover, in the wavelength conversion sheets 100 and 200 shown in FIGS. 1 and 4, respectively, both end faces (the left and right end faces in the figure which are not covered with the wavelength conversion sheet protective films 20 and 23) of the phosphor layer 1 may be sealed with a sealing resin, or alternatively, the entire phosphor layer 1 may be covered with a sealing resin.

EXAMPLES

The present invention will be described in further detail with reference to the examples and comparative example. However, the present invention is not limited to the examples described below.

Example 1

(Production of Wavelength Conversion Sheet Protective Film)

Silicon oxide was provided as an inorganic thin film layer having 0.05 μm thickness on one surface of a polyethylene terephthalate film as a first substrate having 25 μm thickness by vacuum vapor deposition. Then, coating liquid which contained tetraethoxysilane and polyvinyl alcohol was applied on the inorganic thin film layer by wet coating and then heated and dried at 150° C. to form a gas barrier cover layer with thickness of 0.45 μm. Thus, a first film having a first barrier layer made up of the inorganic thin film layer and the gas barrier cover layer disposed on one of the surfaces of the first substrate was obtained.

Then, silicon oxide was provided as an inorganic thin film layer having 0.05 μm thickness on one surface of a polyethylene terephthalate film as a second substrate having 15 μm thickness by vacuum vapor deposition. Then, coating liquid which contained tetraethoxysilane and polyvinyl alcohol was applied on the inorganic thin film layer by wet coating and then heated and dried at 150° C. to form a gas barrier cover layer with thickness of 0.45 μm. Thus, a second film having a second barrier layer made up of the inorganic thin film layer and the gas barrier cover layer disposed on one of the surfaces of the second substrate was obtained.

Then, the first film and the second film were bonded to each other with the respective barrier layers facing each other by using a pressure-sensitive adhesive in a manner as described below. First, the first and second films cut into an A4 size were prepared. A pressure-sensitive adhesive was applied on the first barrier layer of the first film, and heated at 80° C. for one minute. Then, the second film was placed on the pressure-sensitive adhesive by manual feeding, and bonded to the first film by using a laminator under the conditions of a laminate temperature of 60° C. and a line speed of 1 m/min (manual-feed lamination). After that, aging was conducted in an oven at a temperature of 50° C. for two days to obtain a laminate film. As a pressure-sensitive adhesive, a mixture of 20 parts by mass of a base resin (trade name: X-313-405S, manufactured by Saiden Chemical Industry Co., Ltd., acrylic resin, solid content 60.0 mass %), 0.274 parts by mass of a hardener (trade name: K-341, manufactured by Saiden Chemical Industry Co., Ltd., isocyanate resin, solid content 75.5 mass %), and 25 parts by mass of a solvent (ethyl acetate) was used.

Then, a coating liquid containing an acrylic resin and silica fine particles (average particle size of 3 μm) was applied on the second substrate of the second film by wet coating to thereby form a coating layer with a thickness of 5 μm. Thus, a wavelength conversion sheet protective film of an A4 size was obtained. Two pieces of the wavelength conversion sheet protective film was prepared.

(Production of Wavelength Conversion Sheet)

CdSe/ZnS530 (trade name, manufactured by Sigma-Aldrich Co. LLC) as quantum dots was mixed with an epoxy-based photosensitive resin. The mixture solution was applied on the first substrate surface of the first film of the above wavelength conversion sheet protective film, and another wavelength conversion sheet protective film having the same configuration was laminated thereto. After UV curing lamination, a wavelength conversion sheet was obtained. The wavelength conversion sheet thus obtained has a configuration as shown in FIG. 1 except that the wavelength conversion sheet protective film 20 in the wavelength conversion sheet 100 was replaced with the wavelength conversion sheet protective film 21 shown in FIG. 2. In addition, the wavelength conversion sheet thus obtained has an A4 size.

Example 2

The first and second films were produced in the same manner as Example 1. The first film and the second film obtained were bonded to each other with the respective barrier layers facing each other by using the same pressure-sensitive adhesive as that of Example 1 in a manner as described below. That is, the first film and the second film were bonded to each other by using the laminating apparatus shown in FIG. 6 while adjusting the tension applied to the film to the value specified in table 1 (roll lamination). Further, lamination conditions other than the tension were as follows.

(Lamination Conditions)
Plate: oblique line 90L95 μm
Reverse Processing
Substrate width: 320 mm
Impression roll width: 280 mm
Processing rate: 10 m/min
Oven temperature (measurement temperature of the 3 unit oven): 60° C.-70° C.-80° C. from the inlet side
Aging: 50° C. for 2 days The wavelength conversion sheet protective film and the wavelength conversion sheet were obtained in the same manner as Example 1 except that lamination was conducted in the above manner, and finally cut into an A4 size.

Comparative Example 1

The wavelength conversion sheet protective film and the wavelength conversion sheet were obtained in the same manner as Example 2 except that the tension applied to the film during roll lamination was adjusted to the value specified in Table 1, and the sheet was finally cut into an A4 size.

TABLE 1

|  | First feed-out tension $T_1$ (N/m) | Oven tension $T_2$ (N/m) | Second feed-out tension $T_3$ (N/m) | Take-up tension $T_4$ (N/m) | Pinch pressure (MPa) |
| --- | --- | --- | --- | --- | --- |
| Example 1 | — | — | — | — | 0.1 |
| Example 2 | 15 | 120 | 15 | 60 | 0.1 |
| Comparative example 1 | 90 | 120 | 60 | 120 | 0.1 |

<Measurement of Thermal Expansion Coefficient>

Figure 8:
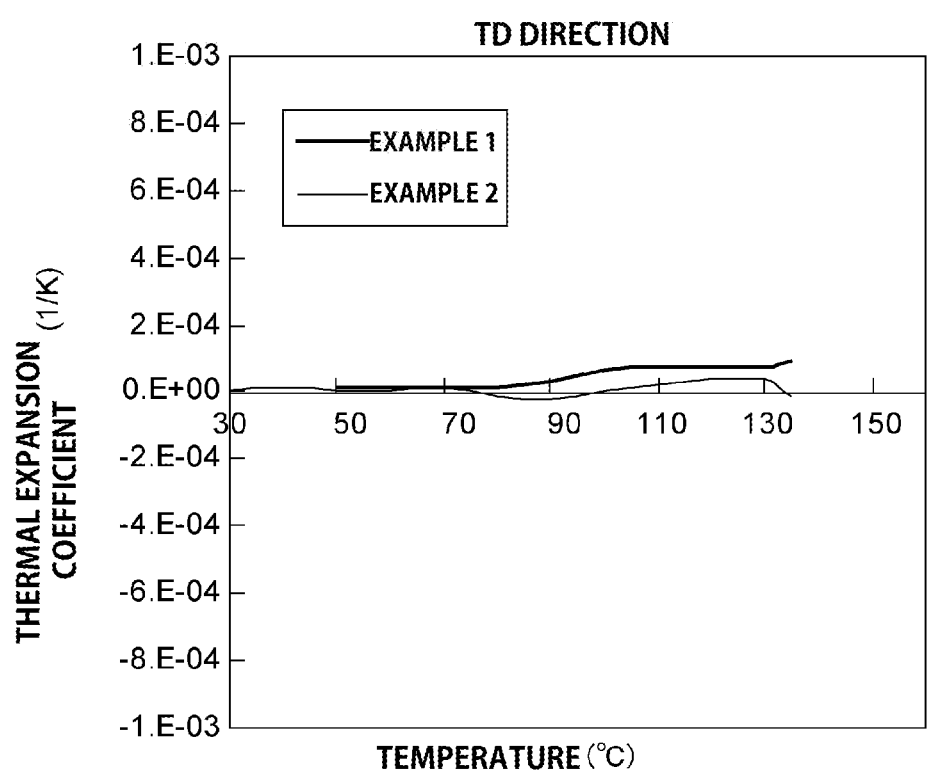
FIG. 8 is a graph showing a relationship between thermal expansion coefficient and temperature in a TD direction of a wavelength conversion sheet protective film of Examples 1 and 2.
Figure 9:
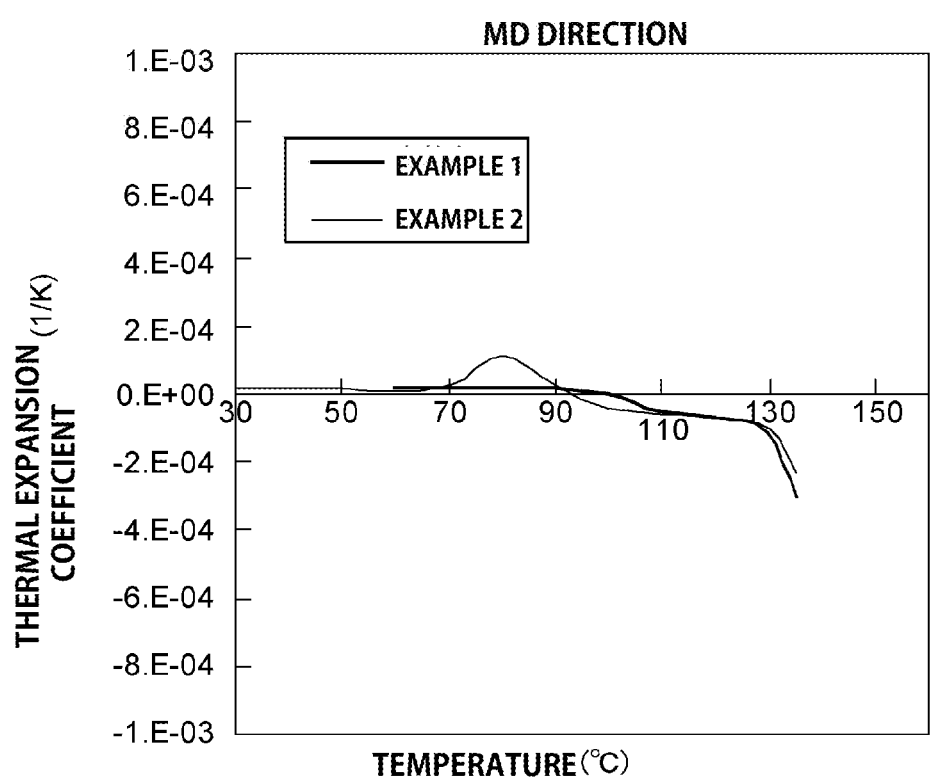
FIG. 9 is a graph showing a relationship between thermal expansion coefficient and temperature in an MD direction of a wavelength conversion sheet protective film of Examples 1 and 2.
Figure 10:
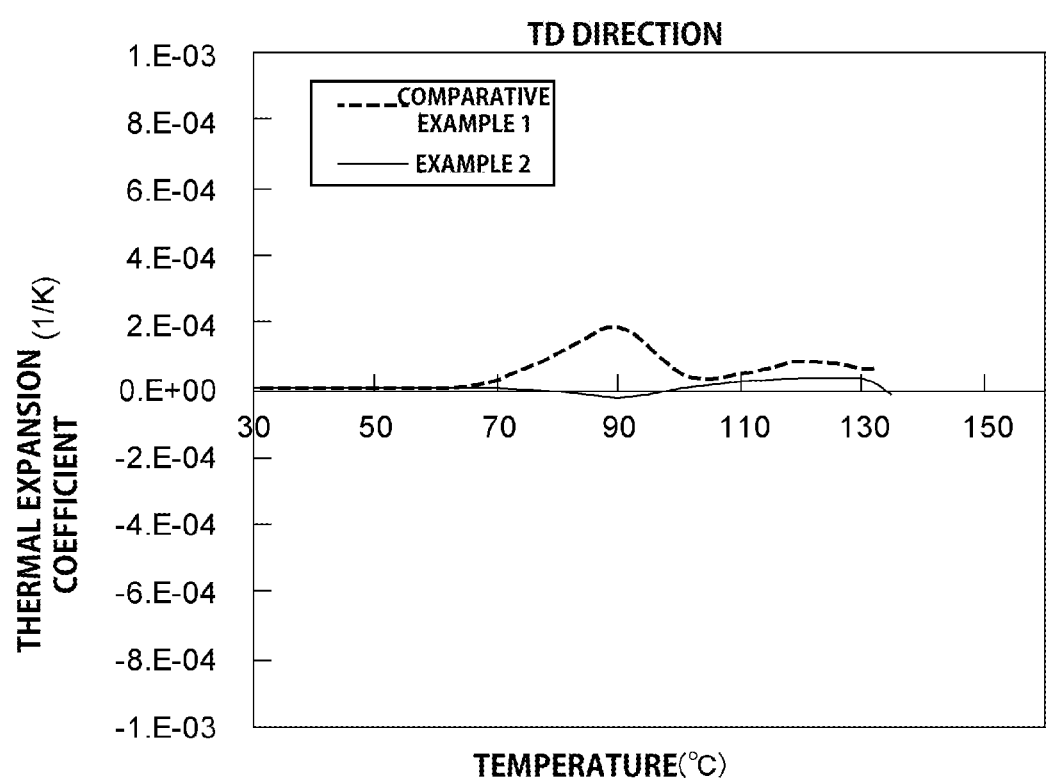
FIG. 10 is a graph showing a relationship between thermal expansion coefficient and temperature in a TD direction of a wavelength conversion sheet protective film of Example 2 and Comparative example 1.
Figure 11:
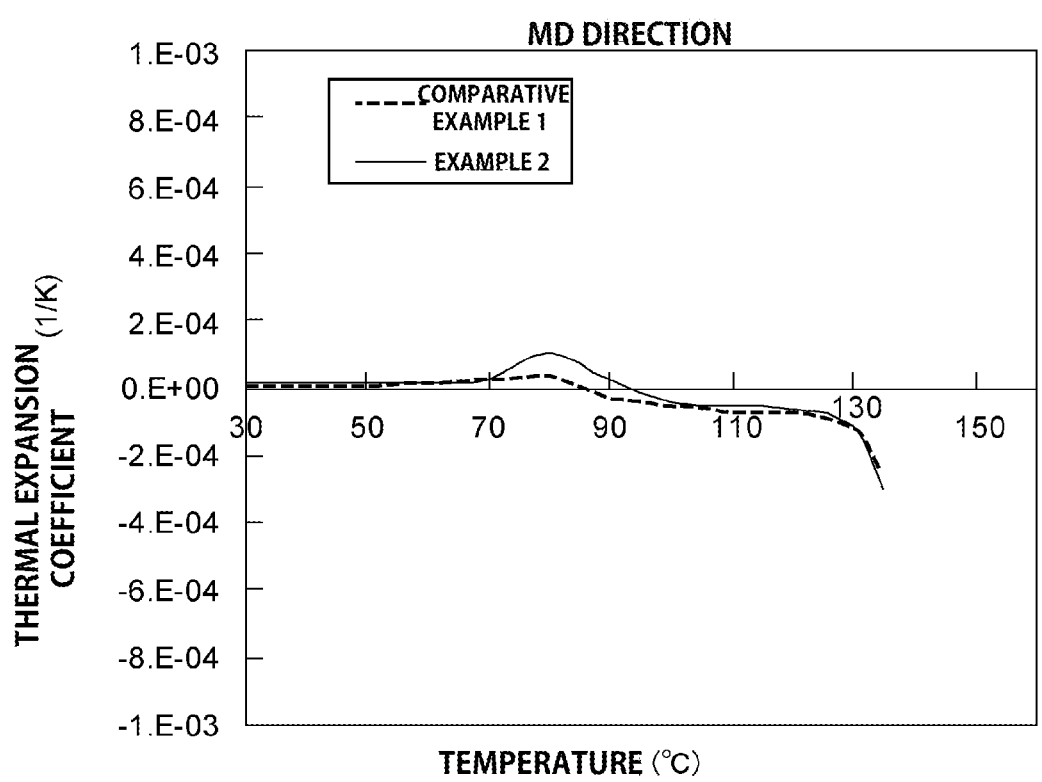
FIG. 11 is a graph showing a relationship between thermal expansion coefficient and temperature in an MD direction of a wavelength conversion sheet protective film of Example 2 and Comparative example 1.

For the wavelength conversion sheet protective film obtained by the examples and comparative example, the thermal expansion coefficient in the MD direction and the TD direction were measured by thermo-mechanical analysis (TMA). The measurement conditions were as follows: Measurement results are shown in FIGS. 8 to 11 and Table 2. FIG. 8 is a graph showing a relationship between thermal expansion coefficient and temperature in the TD direction of the wavelength conversion sheet protective film of Examples 1 and 2, FIG. 9 is a graph showing a relationship between thermal expansion coefficient and temperature in the MD direction of the wavelength conversion sheet protective film of Examples 1 and 2, FIG. 10 is a graph showing a relationship between thermal expansion coefficient and temperature in the TD direction of the wavelength conversion sheet protective film of Example 2 and Comparative example 1, and FIG. 11 is a graph showing a relationship between thermal expansion coefficient and temperature in the MD direction of the wavelength conversion sheet protective film of Example 2 and Comparative example 1. Table 2 shows the maximum value of the thermal expansion coefficient in the TD direction in a temperature range of 30 to 90° C.

(Measurement Conditions)
Load: 50 mN
Temperature rising rate: 5° C./min
Measurement temperature: 30 to 150° C.

<Evaluation of Black Streaks>

The wavelength conversion sheets obtained in the examples and comparative example were placed in an oven at 85° C. and left for 100 hours or 1,000 hours. Then, the surface of the wavelength conversion sheets were observed by using a fluorescence microscope (industrial inspection microscope manufactured by Olympus Corporation, trade name: MX51) that can be used for an observation with white light and ultraviolet (UV) light to check the presence or absence of black streaks. On the basis of the observation results, black streaks were evaluated in accordance with the evaluation criteria described below. The results are shown in Table 2.

A: No black streaks observed after being left for 1000 hours
B: No black streaks observed after being left for 100 hours, but black streaks observed after being left for 1000 hours
C: Black streaks observed after being left for 100 hours

TABLE 2

| | Tension applied to the second film during lamination (N/m) | Maximum value (/K) of thermal expansion coefficient in TD direction at 30 to 90° C. | Evaluation of black streaks |
|---|---|---|---|
| Example 1 | 0 | $0.5 \times 10^{-4}$ | A |
| Example 2 | 15 | $0.1 \times 10^{-4}$ | A |
| Comparative example 1 | 60 | $1.5 \times 10^{4}$ | C |

INDUSTRIAL APPLICABILITY

As described above, according to the present invention, a wavelength conversion sheet protective film that can prevent occurrence of black streaks on the wavelength conversion sheet even if it is exposed to high temperature for a long period of time can be provided. Further, a method of producing the wavelength conversion sheet protective film, and a wavelength conversion sheet using the wavelength conversion sheet protective film and a backlight unit can be provided. Accordingly, a high resolution display which does not have problems such as color defects and display defects can be produced.

REFERENCE SIGNS LIST

1 . . . phosphor layer, 3 . . . phosphor, 4 . . . sealing resin, 5 . . . first film, 6 . . . adhesive layer, 7 . . . second film, 8 . . . coating layer, 9 . . . first substrate, 10 . . . first barrier layer, 11 . . . inorganic thin film layer, 12 . . . gas barrier cover layer, 14 . . . second substrate, 15 . . . second barrier layer, 16 . . . inorganic thin film layer, 17 . . . gas barrier cover layer, 18 . . . LED light source, 19 . . . light guide plate, 20, 21, 22 . . . wavelength conversion sheet protective film, 52 . . . first film, 54 . . . second film, 56 . . . laminated film, 62 . . . first feed-out roll, 64 . . . second feed-out roll, 66 . . . take-up roll, 72 . . . adhesive application unit, 74 . . . guide roll, 76 . . . pinch roll, 82 . . . oven, 100, 200 . . . wavelength conversion sheet, 500 . . . backlight unit, $T_1$ . . . first feed-out tension, $T_2$ . . . oven tension, $T_3$ . . . second feed-out tension, $T_4$ . . . take-up tension

What is claimed is:

1. A wavelength conversion sheet comprising:
a phosphor layer which contains phosphors; and
a wavelength conversion sheet protective film on a surface of the phosphor layer, wherein the wavelength conversion sheet protective film comprises:
a first film, which includes a first substrate and a first barrier layer,
and a second film, which includes a second substrate,
wherein the first film and the second film are bonded to each other at a surface of the first barrier layer and one surface of the second substrate via an adhesive layer,
wherein one of the first and the second substrates has a coating layer that faces away from the phosphor layer and the coating layer is an outermost layer of the wavelength conversion sheet protective film, and
wherein the protective film has a maximum value of a thermal expansion coefficient in a TD direction in a temperature range of 30 to 90° C. is about $0.3 \times 10^{-4}$/K or less.

2. The wavelength conversion sheet of claim 1, wherein the second film further includes a second barrier layer, and a surface of the second barrier layer of the second film is in contact with the adhesive layer.

3. The wavelength conversion sheet of claim 1, wherein one of the first and the second substrates are in direct physical contact with the phosphor layer.

4. A backlight unit comprising:
an LED light source;
the wavelength conversion sheet of claim 1; and
a light guide plate that allows light from the LED light source to be incident on the wavelength conversion sheet.

5. A wavelength conversion sheet comprising:
a phosphor layer which contains phosphors; and
a first wavelength conversion sheet protective film on a first surface of the phosphor layer and a second wavelength conversion sheet protective film on a second surface of the phosphor layer, wherein the second surface is opposite to the first surface, wherein each of the first and the second wavelength conversion sheet protective films comprises
a first film, which includes a first substrate and a first barrier layer,
and a second film, which includes a second substrate,
wherein the first film and the second film are bonded to each other at a surface of the first barrier layer and one surface of the second substrate via an adhesive layer, wherein the second film further includes a second barrier layer, and a surface of the second barrier layer of the second film is in contact with the adhesive layer and wherein the protective film has a maximum value of a thermal expansion coefficient in a TD direction in a temperature range of 30 to 90° C. is about $0.3 \times 10^{-4}$/K or less.

6. A backlight unit comprising:

an LED light source;

the wavelength conversion sheet of claim 5; and a light guide plate that allows light from the LED light source to be incident on the wavelength conversion sheet.

* * * * *